March 18, 1969  L. H. FOX  3,433,097
EPICYCLIC CHANGE SPEED GEAR HUBS
Filed June 1, 1966

Leonard H. Fox  INVENTOR:
BY
Bierman & Bierman

United States Patent Office 3,433,097
Patented Mar. 18, 1969

3,433,097
EPICYCLIC CHANGE SPEED GEAR HUBS
Leonard Haydn Fox, Nottingham, England, assignor to Raleigh Industries Limited, a corporation of Great Britain
Filed June 1, 1966, Ser. No. 554,478
Claims priority, application Great Britain, May 29, 1965, 22,940/65
U.S. Cl. 74—750            3 Claims
Int. Cl. F16h 3/44

ABSTRACT OF THE DISCLOSURE

An epicyclic change speed gear mechanism in which back pedaling causes rotatable pawls to ride along cams to a position alternately into and out of engagement with a ratchet affixed to the shell of the mechanism whereby the drive is alternately direct from the pedals (high gear) and indirect through the epicyclic gears (low gear).

---

The invention concerns epicyclic change speed gear hubs and has more particular reference to a bicycle or like change speed gear hub in which gear change is effected by means of a back-pedalling movement as applied to the hub.

It is the primary object of the present invention to provide a simple yet efficient change speed gear hub in which gear change from one gear to another is effected automatically upon the application of a reverse motion to the chain sprocket.

According to the present invention an epicyclic change speed gear hub in which gear change is effected by the selective coupling of a driving member with a hub shell direct or through an epicyclic gear arrangement is characterised in that a coupling and selecting sleeve is provided which, in one angular position relative to the driven member of the epicyclic gear arrangement, allows of a drive transmission to the gear hub through the epicyclic, but in another angular position by-passes such epicyclic, the adjustment between the said positions being effected by applying a reverse motion to the sleeve relative to the driven member.

In a preferred embodiment the said sleeve presents one or more cam surfaces arranged to control the position of a pawl or pawls through which a drive is transmitted direct to the hub, the said cam surfaces being arranged selectively to cause the said pawl or pawls to make or not make driving connection with its or their associated ratchet as required.

Figure 1:
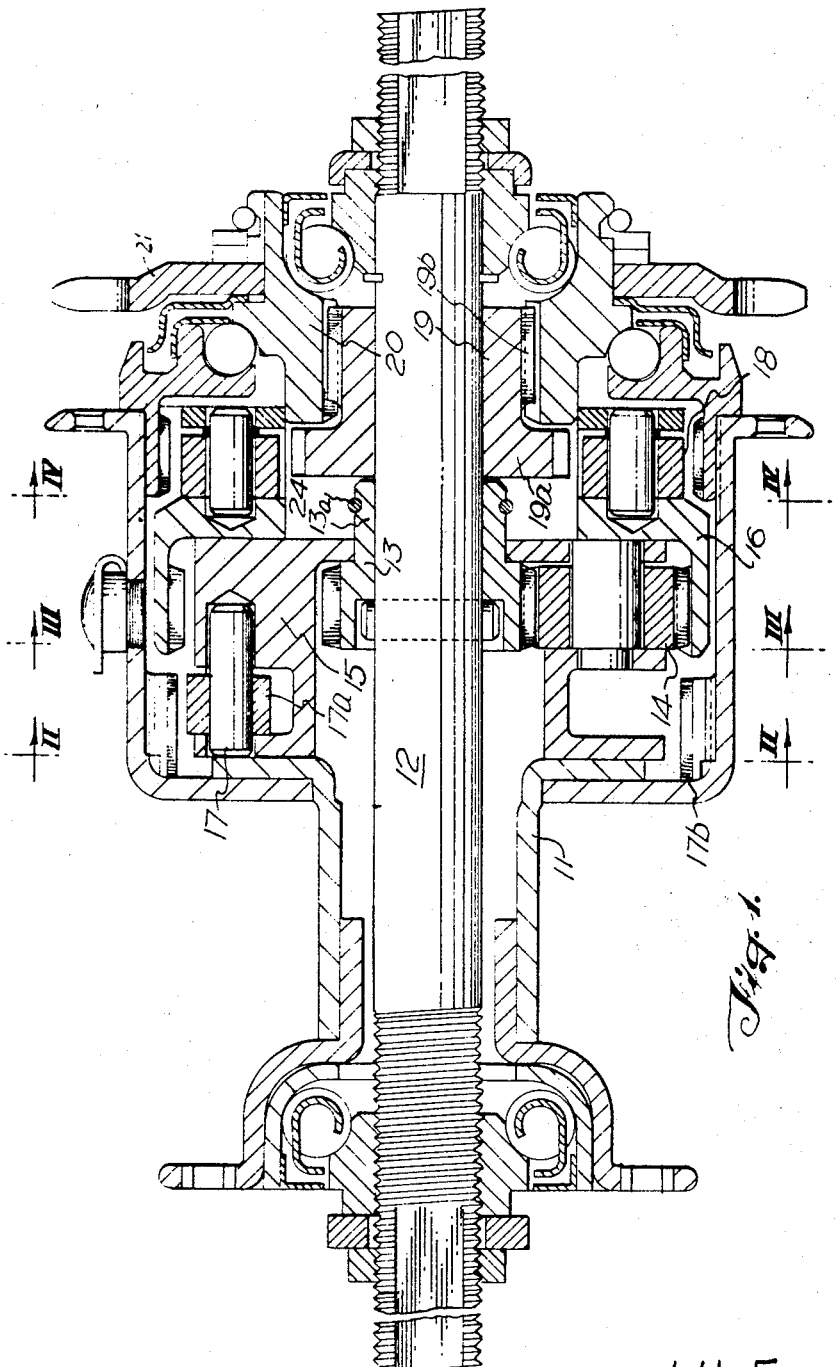
Figure 2:
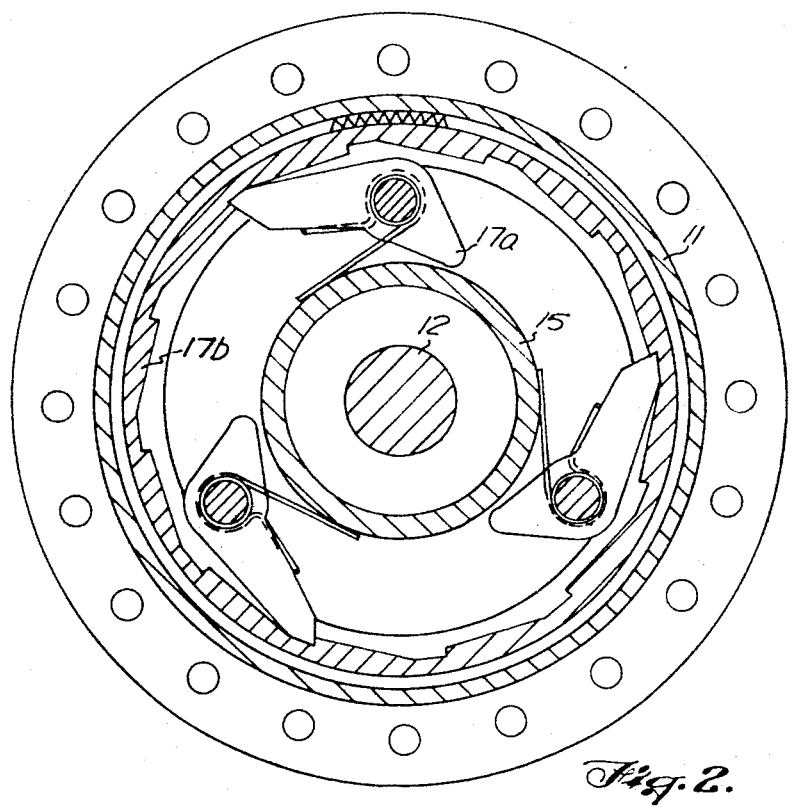
Figure 3:
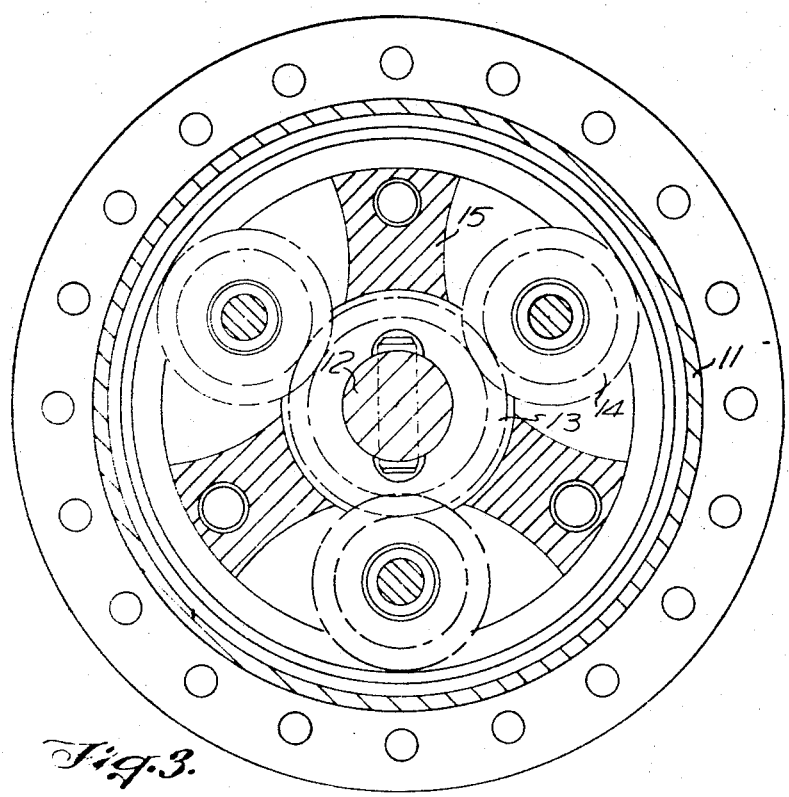
Figure 4:
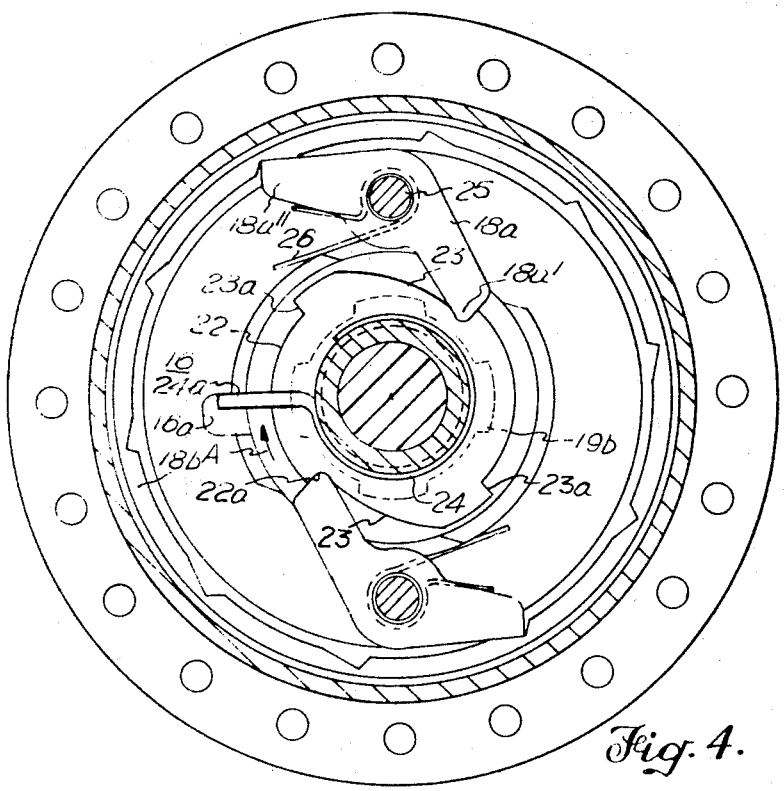
Figure 6:
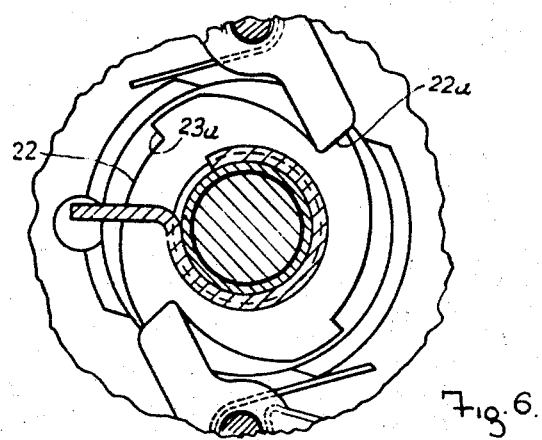
Figure 5:
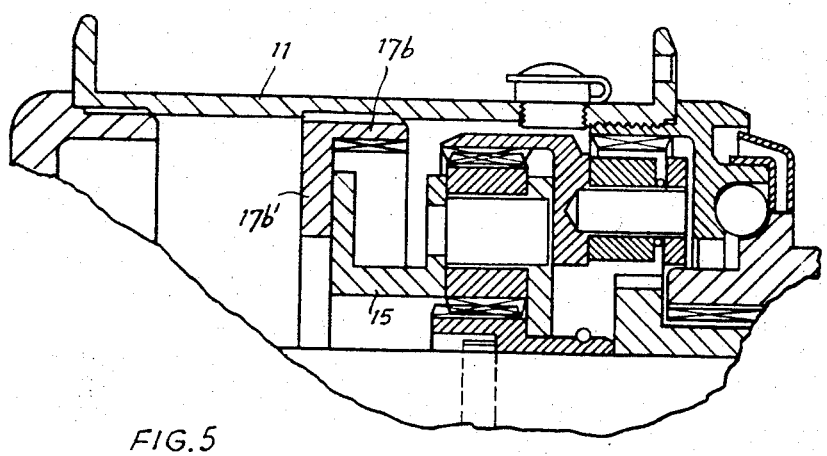

The invention will now be described further, by way of example only, with reference to the accompanying drawings, in which:

FIG. 1 is a longitudinal section taken through a change speed hub constructed in accordance with the present invention;

FIGS. 2, 3 and 4 are sections on lines II—II, III—III and IV—IV respectively of FIG. 1; and FIGS. 5 and 6 are scrap views of an alternative embodiment and corresponds to parts of FIGS. 1 and 4 respectively.

Referring now to the drawings and particularly to FIGS. 1 to 4 thereof, a bicycle change speed hub comprises a stepped hub shell 11, a spindle 12 directed axially of the said shell 11, a sun gear 13 non-rotatably mounted on the spindle, a multiplicity of planet gears 14 in engagement with the said sun gear 13 and each rotatably mounted in a planet cage 15, a gear ring 16 in mesh with the said planet gears 14 and disposed outwardly thereof, a first pawl and ratchet means 17 positioned between the planet cage 15 and the hub shell 11, a second such means 18 between the gear ring 16 and the hub shell 11, and a coupling and gear selection sleeve 19 adapted selectively to couple a driver 20 to the hub shell 11 or gear ring 16 as desired.

The coupling and gear selection sleeve 19, see now particularly FIGS. 1 and 4, comprises a cylindrical sleeve freely rotatable on the spindle and having a radial flange 19a at the inner end thereof, the opposite end thereof presenting splines 19b or like structures at the outer periphery thereof to be drivingly engageable with the driver, such driver having a sprocket wheel 21 secured thereto in conventional manner. The radial flange 19a is provided with two pairs of cam surfaces 22, 23 (FIG. 4) at the outer periphery thereof, the individual surfaces of each pair being diametrically opposed one to the other, and the tails 18a' of the pawls 18a of the second pawl and ratchet means 18 bear against such cam surfaces 22, 23, the noses 18a'' of such pawls being engageable with the ratchet ring 18b secured to the hub shell. As is readily apparent from FIG. 4, the cam surfaces of the two pairs of cams are at different radial distances from the axis of the sleeve, cam surfaces 22 being at a constant or substantially constant radius and leading to a drive seating 22a whilst gear cam surfaces 23 are of an increasing radius towards gear seat 23a the latter seating being at a greater radius than the seatings 22a. Each pawl 18a is spring loaded into engagement with the hub shell 26.

A drag spring 24 is provided which extends around the shank 13a of the sun gear 13 and presents a tail 24c engaging a pocket 16a in gear ring 16.

The operation of the hub is as follows:

With the relative disposition of parts shown in FIG. 4 high gear (i.e. direct drive) is engaged, the pawls 18 effecting a direct driving coupling between the sleeve 19 and the hub shell 11, the pawls 17a over-running their associated ratchet ring 17b. A reverse motion of the sleeve that is to say a movement of the sleeve in the direction of the arrow A in FIG. 4 relative to the gear ring, as would result from back pedalling, will cause the pawls 18a to become disengaged from the ratchet ring 18b the tails 18a' of the said pawls riding up the cam surfaces 23 to drop into the seat 23a, such seat 23a being at the greater radius than the one previously occupied by the said tail. Forward motion of the sleeve 19, after having effected the adjustment described, will result in the driving of the hub through gear ring 16 and the epicyclic, the final drive to the shell 11 being through the first pawl and ratchet means 17, the motion of the coupling sleeve 19 being transmitted to the gear ring 16 via the pins 25 of the pawls 18a in the reduced gear.

If it is desired to re-select normal gear then a further reverse motion of the sleeve relative to the gear ring is effected, the pawls 18a during such motion moving along the cam surfaces to drop into the seatings 22a, the springs 26 encouraging the pivotal motion of the pawls again engage the ratchet ring 18b.

Thus, it will be apparent that to change gear it is necessary only to cause the selection sleeve to move in a reverse sense relative to the gear ring, that is to say, to pedal backwards.

In an alternative embodiment, see FIGS. 5 and 6 in which like numerals to those of FIGS. 1 to 4 are used for the same or similar parts, the hub shell 11 is of constant diameter throughout its full axial extent and the ratchet ring 17b such ring being located in a channel in the wall of the hub shell provided with a radially inwardly directed flange 17b which defines a shoulder against which the planet cage 15 abuts and by which such cage is located axially of the shell. The cam surfaces 22, 23 as provided on the flange 19a are modified slightly in that both such surfaces are now of increasing radial distance from the axis of the sleeve towards the respective seatings. As a consequence, and on the assumption that the coatings themselves are disposed at the self same radial separation from the sleeve axis, the area of surface engagement at the seating 23 is increased as compared with the arrangement shown in FIGS. 1 to 4.

The construction of the remainder of the hub and the operation thereof is similar to that of the hub shown in FIGS. 1 to 4.

The invention is not restricted to the exact features of the embodiments hereinbefore described since still further alternatives will readily present themselves to one skilled in the art. Thus, for example, the form of cam and the number of pawls in engagement therewith may be varied without departing from the scope of the present invention.

I claim:
1. In a change speed hub consisting of a hub shell, a spindle axially positioned with respect to said shell, a sun gear fixed to said spindle, a plurality of planet gears in engagement with said sun gear, each of said planet gears rotatably mounted in a planet cage, said sun and planet gears constituting a reduction gearing, a gear ring meshing with said planet gears and disposed radially outwardly thereof, a first pawl and ratchet means on said cage and said shell respectively, said first pawl and ratchet means being out of engagement with said shell when said shell is rotating faster than said cage, the improvement which comprises a second pawl and ratchet means on said ring and said shell respectively, a cylindrical selection sleeve on said spindle and rotatable with respect thereto, driving means mounted on said spindle and rotatable with respect thereto located axially adjacent one end of said sleeve, means for engagement of said one end by said driving means, a radial flange on said sleeve adjacent the other end having a plurality of drive cam surfaces thereon and a plurality of gear cam surfaces thereon each said second pawl means having a nose and a tail, said nose adapted to engage said second ratchet means, said tail following said cam surfaces, said drive cam surfaces leading to a drive seat and said gear cam surfaces leading to a gear seat, said tail adapted to engage alternatively said gear seat and said drive seat, said gear seat being radially further outwardly of said spindle than said drive seat whereby, when said tail is in said drive seat, said nose engages said second ratchet means, and the drive is direct from said driving means to said shell, when said tail is in said gear seat, said nose is out of engagement with said second ratchet means, and the drive is indirect from said driving means through said reduction gear to said shell.

2. A hub according to claim 1 wherein each of said second pawls is mounted for rotating movement about an axis between said nose and said tail.

3. A hub according to claim 1 wherein the noses of said second pawls are urged toward engagement with said ratchet ring.

References Cited

UNITED STATES PATENTS

| | | | |
|---|---|---|---|
| 2,143,798 | 1/1939 | Ribe. | |
| 2,910,157 | 10/1959 | Gleasman | 74—750 |
| 3,135,368 | 6/1964 | Shimano | 192—6 |
| 3,186,259 | 6/1965 | La Brie | 74—750 |
| 3,211,023 | 10/1965 | Schwerdhofer | 74—750 |
| 3,270,589 | 9/1966 | Schwerdhofer | 74—750 |

FOREIGN PATENTS

| | | |
|---|---|---|
| 998,290 | 9/1951 | France. |
| 4,639 | 1906 | Great Britain. |

DONLEY J. STOCKING, *Primary Examiner.*

T. C. PERRY, *Assistant Examiner.*

U.S. Cl X.R.

29—25.15; 339—144